(12) United States Patent
Paul et al.

(10) Patent No.: US 8,676,908 B2
(45) Date of Patent: Mar. 18, 2014

(54) METHOD AND SYSTEM FOR SEAMLESS INTERACTION AND CONTENT SHARING ACROSS MULTIPLE NETWORKS

(75) Inventors: Sanjoy Paul, Karnataka (IN); Anil Sarin, Karnataka (IN); Santosh Krishnamurthy, Karnataka (IN)

(73) Assignee: Infosys Limited (IN)

( * ) Notice: Subject to any disclaimer, the term of this patent is extended or adjusted under 35 U.S.C. 154(b) by 134 days.

(21) Appl. No.: 13/071,960

(22) Filed: Mar. 25, 2011

(65) Prior Publication Data

US 2012/0136943 A1 May 31, 2012

(30) Foreign Application Priority Data

Nov. 25, 2010 (IN) .......................... 3558/CHE/2010

(51) Int. Cl.
    *H04L 12/58* (2006.01)
(52) U.S. Cl.
    USPC ............ 709/206; 709/204; 709/205; 713/186
(58) Field of Classification Search
    USPC .................................. 709/204–207; 713/186
    See application file for complete search history.

(56) References Cited

U.S. PATENT DOCUMENTS

| | | | |
|---|---|---|---|
| 5,884,246 A * | 3/1999 | Boucher et al. .................. 704/2 |
| 7,299,286 B2 * | 11/2007 | Ramsayer et al. ............. 709/228 |
| 7,483,525 B2 * | 1/2009 | Chaddha et al. ......... 379/142.07 |
| 7,720,909 B2 * | 5/2010 | Bantz et al. .................... 709/205 |
| 7,849,144 B2 * | 12/2010 | Prajapat et al. ............... 709/206 |
| 7,917,583 B2 * | 3/2011 | Angiolillo et al. ............ 709/204 |
| 8,027,438 B2 * | 9/2011 | Daigle et al. ............... 379/88.06 |
| 8,051,472 B2 * | 11/2011 | Maes ................................. 726/8 |
| 8,117,268 B2 * | 2/2012 | Jablokov et al. .............. 709/206 |
| 2006/0146997 A1 * | 7/2006 | Qian et al. .................. 379/88.16 |
| 2007/0041370 A1 * | 2/2007 | Cleveland ...................... 370/352 |
| 2007/0041557 A1 * | 2/2007 | Chatterjee et al. ........ 379/218.01 |
| 2007/0130260 A1 * | 6/2007 | Weintraub et al. ............ 709/204 |
| 2007/0162600 A1 * | 7/2007 | Lu .................................. 709/225 |
| 2007/0168450 A1 * | 7/2007 | Prajapat et al. ............... 709/207 |
| 2007/0203979 A1 * | 8/2007 | Walker et al. ................. 709/204 |
| 2007/0239837 A1 * | 10/2007 | Jablokov et al. ............. 709/206 |
| 2007/0244969 A1 * | 10/2007 | Knight et al. ................. 709/204 |
| 2007/0288543 A1 * | 12/2007 | Evans et al. ................... 709/200 |
| 2008/0032721 A1 * | 2/2008 | MacDonald et al. ......... 455/466 |
| 2008/0101339 A1 * | 5/2008 | Forbes et al. ................. 370/352 |
| 2008/0141175 A1 * | 6/2008 | Sarna et al. ................... 715/848 |
| 2008/0162645 A1 * | 7/2008 | Kraft et al. .................... 709/206 |
| 2008/0189360 A1 * | 8/2008 | Kiley et al. ................... 709/203 |
| 2008/0249867 A1 * | 10/2008 | Angell et al. ................... 705/14 |
| 2008/0268882 A1 * | 10/2008 | Moloney ....................... 455/466 |

(Continued)

*Primary Examiner* — Alina N. Boutah
(74) *Attorney, Agent, or Firm* — Lerner, David, Littenberg, Krumholz & Mentlik, LLP

(57) ABSTRACT

A system and method for communication between a plurality of users in a communication network are disclosed. Each of the plurality of users is associated with at least one communication device. The method includes receiving a message from a sender intended for at least one recipient in the communication network wherein the sender has initiated sending of the message using the associated communication device. The message may be selected from a group comprising text, audio, video and multimedia. The method further includes customizing the message for at least one communication device associated with the at least one recipient based on a set of rules. Additionally, the method includes delivering the customized message to the at least one communication device associated with the at least one recipient based on the availability of the at least one recipient on the at least one communication device.

47 Claims, 10 Drawing Sheets

(56) References Cited

U.S. PATENT DOCUMENTS

| | | | |
|---|---|---|---|
| 2009/0049190 A1* | 2/2009 | Jiang et al. | 709/238 |
| 2009/0198777 A1* | 8/2009 | LaFreniere et al. | 709/206 |
| 2009/0265429 A1* | 10/2009 | Gestsson et al. | 709/204 |
| 2010/0042932 A1* | 2/2010 | Lehtiniemi et al. | 715/747 |
| 2010/0056109 A1* | 3/2010 | Wilson et al. | 455/412.1 |
| 2010/0075673 A1* | 3/2010 | Colbert et al. | 455/435.1 |
| 2010/0159891 A1* | 6/2010 | Sigmund et al. | 455/413 |
| 2010/0162300 A1* | 6/2010 | Velazquez et al. | 725/33 |
| 2010/0174786 A1* | 7/2010 | Chalemin et al. | 709/206 |
| 2010/0228825 A1* | 9/2010 | Hegde et al. | 709/204 |
| 2010/0313255 A1* | 12/2010 | Khuda | 726/7 |
| 2010/0318622 A1* | 12/2010 | Granito et al. | 709/206 |
| 2011/0219080 A1* | 9/2011 | McWithey et al. | 709/206 |
| 2011/0276883 A1* | 11/2011 | Cabble et al. | 715/727 |
| 2011/0289144 A1* | 11/2011 | Underwood | 709/204 |
| 2011/0289161 A1* | 11/2011 | Rankin et al. | 709/206 |
| 2011/0289174 A1* | 11/2011 | Malik | 709/206 |
| 2012/0123864 A1* | 5/2012 | Mueller et al. | 705/14.53 |
| 2012/0278454 A1* | 11/2012 | Stewart et al. | 709/220 |
| 2013/0007150 A1* | 1/2013 | Hertz et al. | 709/206 |
| 2013/0019262 A1* | 1/2013 | Bhatia et al. | 725/34 |
| 2013/0033561 A1* | 2/2013 | Kwon et al. | 348/14.01 |

* cited by examiner

METHOD AND SYSTEM FOR SEAMLESS INTERACTION AND CONTENT SHARING ACROSS MULTIPLE NETWORKS

BACKGROUND OF THE INVENTION

1. Technical Field of the Invention

The present technique relates in general to a method and system for seamless interaction and content sharing across multiple networks. More particularly, the present technique relates to a system and a method for enabling sharing message between multiple devices.

2. Description of the Related Art

Presently, the communication between people is the buzz of the world. Traditionally, telephones have been used to enable communication between people. Subsequently, the advent of mobile based communication has paced up the communication enormously. Further, the Internet has completed the lacunae of communication channel where a user of the Internet services, using a desktop or a laptop or any other similar device, is capable of communicating with other users. As evident, a mobile device has enabled users to interact between themselves seamlessly.

Presently, television has captured the place of the most entertaining device worldwide. At any point in time in a day, hundreds of programs are broadcasted on one or another channel. Television has become a major source of media presentation. While home, most people like to spend time watching one or another entertainment program. Software programming has enabled the viewers to select any of the broadcasted channels to watch an entertainment program of their choice. However, the television is more of an unintelligent device. While watching an entertainment program on a television, the viewer is virtually disconnected from the rest of the world as he may not be able to interact with other people. While watching a program, a viewer may wish to suggest to others to watch the entertainment program. However, then, he is required to use his communicating device i.e., a mobile phone, telephone and the like to convey his message. Consequently, the viewer may be required to stop watching the entertainment program if he desires to convey his message to other person. Also, many a time, for other persons, it becomes difficult to communicate to a television program viewer since he/she may not be available on a communicating device and television does not facilitate any interaction with other people. Also, other people may not have capability to know the presence of the viewer.

Therefore, there is a need to enable an entertainment program viewer on a television or a TV program enabled mobile phone to communicate with other persons. Also, there is a need to enable other persons to know the presence of the viewer for instant communication.

SUMMARY OF THE INVENTION

The present invention relates to a system and a method for social networking across multiple communication devices. The message communication between users of a social networking service/application is enabled based on a preferred communication device and device capabilities. The user of the social networking application can send and receive message communication from a set-top box, a mobile device, a personal desktop/laptop device and a telephone device. The user of the communication device may initiate a message communication using any of the associated communication devices and receive message communication based on a set of rules. One or more processing modules are implemented on a convergence gateway to facilitate seamless message communication. Additionally, one or more processing modules may be implemented on one or more communication devices.

The message communication can be an instant message, a multimedia message, a video message, stored content and the like. Additionally, the user can create a buddy list and interact with the members of the buddy list. A buddy group may be created from the buddy list where members of buddy the list can be grouped based on the user's interest.

Additionally, the user can refer a multimedia message to others or provide his own opinion on a multimedia content. On referring a multimedia message or providing an opinion, the user may be credited one or more credit points. The credited points can be used to obtain an item or a service.

DRAWINGS

These and other features, aspects, and advantages of the present technique will become better understood when the following detailed description is read with reference to the accompanying drawings in which like characters represent like parts throughout the drawings, wherein.

DETAILED DESCRIPTION

The following description is full and informative description of the best method and system presently contemplated for carrying out the present invention which is known to the inventors at the time of filing the patent application. Of course, many modifications and adaptations will be apparent to those skilled in the relevant arts in view of the following description in view of the accompanying drawings and the appended claims. While the systems and method described herein are provided with a certain degree of specificity, the present technique may be implemented with either greater or lesser specificity, depending on the needs of the user. Further, some of the features of the present technique may be used to advantage without the corresponding use of other features described in the following paragraphs. As such, the present description should be considered as merely illustrative of the principles of the present technique and not in limitation thereof, since the present technique is defined solely by the claims.

Figure 1:
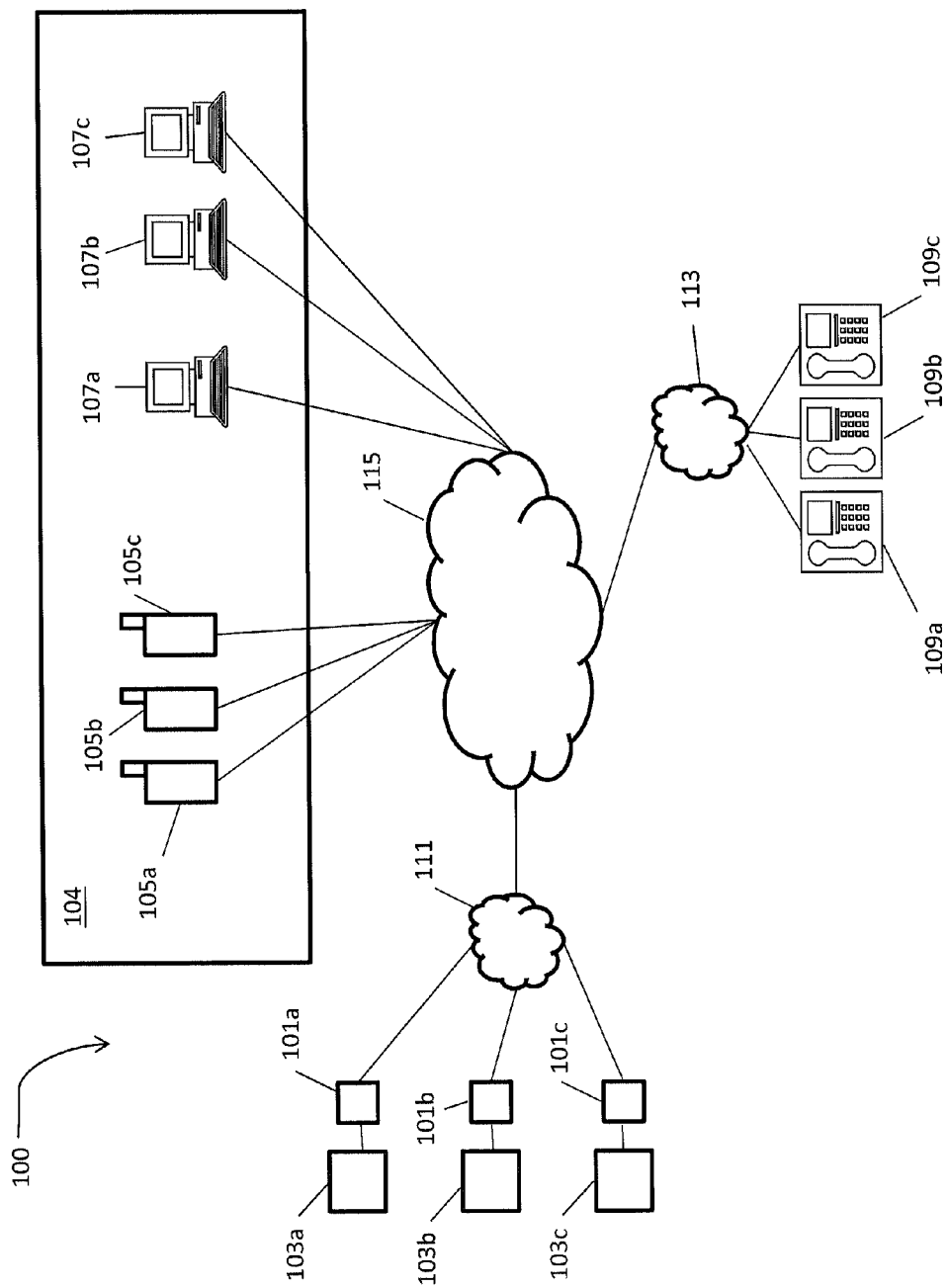
FIG. 1 illustrates a system diagram enabling communication between a plurality of communication devices associated with users, in accordance with one embodiment of the present technique.

Referring to drawings, FIG. 1 illustrates a system enabling message communication between a plurality of communication devices associated with users, in accordance with one embodiment of the present technique. For example, the system 100 includes one more set-top boxes (STB devices) 101a-101c, one or more communication devices, for example one or more mobile devices 105a-105c, one or more personal desktop or laptop 107a-107c, and one or more telephone machines 109a-109c. Additionally, the system 100 includes a media content provider 111, a network system 115, and a public switched telephone network (PSTN) network 113. The STB devices 101a to 101c are connected to one or more display devices 103a to 103c. Similarly, the STB device 101b is connected to TV 103b and the STB device 101c is connected to a television (TV) 103c. Additionally, one or more STB devices, for example, STB device 101a is connected to a media content provider 111 wherein the media content provider 111 includes, but is not limited to, IPTV, digital cable, available-on-demand service provider and the like. It should be noted that the STB device and the TV, such as the STB device 101a and the TV 103a may be an integrated unit and such an integrated unit is within the scope of the present technique. For those skilled in the art, it will be apparent that the media content includes, but is not limited to, video content, audio content, multimedia content, image content, text content and the like. The concept of multimedia is well known to those skilled in the art and it includes video, audio, and the like.

In an embodiment, a message sender, for example a viewer associated with the STB device 101a, while watching an entertainment program that is being broadcasted on the TV 103a through the STB device 101a, may intend to initiate a message communication with a recipient associated with a communicating device, for example a computing device 104 or a telephone device 109a. The types of message communication include, but are not limited to, an instant message, a short message service (SMS), an Instant Messaging (IM), a multimedia messaging service (MMS), audio, video, email and the like. The message communication initiated from the STB device 101a is routed through the media content broadcaster 111 and network system 115 to the computing device 104. In other words, an entertainment program viewer on the TV 103a can send a message to a computing device associated with the recipient.

In yet another embodiment, alternatively, a sender associated with a computing device 104, such as a mobile device 105a or a personal desktop/laptop device 107a, initiates a message communication with a STB device, such as the STB device 101a wherein the message is displayed on the associated display device, that is, the TV 103a.

In an embodiment, the message being delivered to the one or more communication devices is customized based on an associated set of rules. The associated set of rules includes identifying a preferred communication device from a list of communication devices associated with a user and/or device capabilities thereof. Normally, a user, for example a recipient, may register one or more than one communication devices 104. Therefore, the recipient may be provided with the capability to receive a message on any of the associated mobile device 105a, personal desktop/laptop device 107a and on the TV 103 through the STB device 101a where the recipient has registered these associated devices as message receiving devices. The preferred communication device is identified based on personal choice of the recipient, presence information, type of message, time of receiving the message, environment and location of the recipient. In one embodiment, based on personal choice, a recipient may assign one of the registered communicating devices as a preferred communication device among the multiple associated communicating devices. For example, a recipient may assign mobile device 105a as a preferred communicating device from a list of associated mobile device 105a, personal desktop/laptop device 107a, TV 103a associated with STB device 101a, and telephone device 109a. In the event of receiving a message, the message is delivered to the preferred communication device, that is, on mobile device 105a even though the recipient appears online on multiple associated devices. When a recipient assigns a preferred device from among the multiple associated communication devices, it indicates that he wants to receive message on the assigned communication device only. In yet another embodiment, the message is delivered based on the presence. For example, among the multiple associated devices, the recipient may voluntarily set presence information on particular communication devices, For example, the recipient may appear online on mobile device 105a while appear offline on other associated communication devices. Thus, the sender may find the recipient online on mobile device 105a and sends a message on mobile device 105a. In another embodiment, the message communication is delivered to an appropriate communication device based on the type of the message. For example, the recipient may have associated multiple communication devices, for example a mobile device 105a wherein the mobile device 105a is a low end mobile device, a TV 103a associated with a STB device 101a, a personal desktop/laptop device 107a and the like. Those skilled in the art will appreciate that a TV has better screen resolution and capability to display video content than a mobile device. If the message received is a video message, then the video message is preferably delivered to the TV 103a through the STB 101a. In yet another embodiment, the preferred communication device is selected based on the time of receiving the message communication. For example, during the day time, for example at around 2 PM, a recipient would like to receive message on his mobile device whereas in the night, say at around 9 PM, a recipient would like to receive the message communication on his television device as he would be watching television at that time. The time periods mentioned are exemplary and a user may define the time period and the type of associated communication for receiving the message communication. The location of the user can also determine his/her preferred device, for example while in his 'OFFICE' wherein 'OFFICE' is selected as a location, the message may preferably be received on desktop/laptop 107a, while away from his desktop/laptop, the message may preferably be received on mobile device 105a such as a smart phone or a mobile phone. The location can also be the name of a place, city and the like. In yet another embodiment, the message may be delivered based on the environment around the recipient. For example, if the recipient select environment as 'with family members', the message may preferably be delivered at mobile device 105a.

Further, the communication device capability is identified when the communication device is registered. For example, if the registered communication device is a mobile device 103, the identification of capabilities of mobile device 103a includes, but is not limited to, handling MMS, video, audio, bandwidth, screen resolution and the like. Based on the capability of the recipient's communication device, the message communication is customized. Video message to audio message, text to audio, audio to text conversions are few of the examples of message customization. For those skilled in the art, it will be apparent that message conversion from one format to another may be customized and is within the scope of the present technique. Additionally, a sender associated with a communicating device may communicate with a recipient based on the presence of the recipient. For example, a recipient may be associated with a mobile device 105a, a personal desktop/laptop device 107a, a telephone device 109a and a TV 103a through STB device 101a. Also, the recipient may have assigned the mobile device 105a as the preferred communication device. However, since the recipient is watching an entertainment program at the given moment, the recipient receives a message communication on TV 103a through STB device 101a based on his presence on the STB device 101a.

In yet another embodiment, a social networking application is implemented on a communication device that can execute a software application, for example, the social networking application may be implemented on a processing device, such as an application server (not shown in FIG. 1). Alternatively, the social networking application can be executed on the mobile device 105a, the STB device 101a, and personal desktop/laptop device 107a. The social networking application facilitates interaction between the users using the associated communication device.

Figure 2:
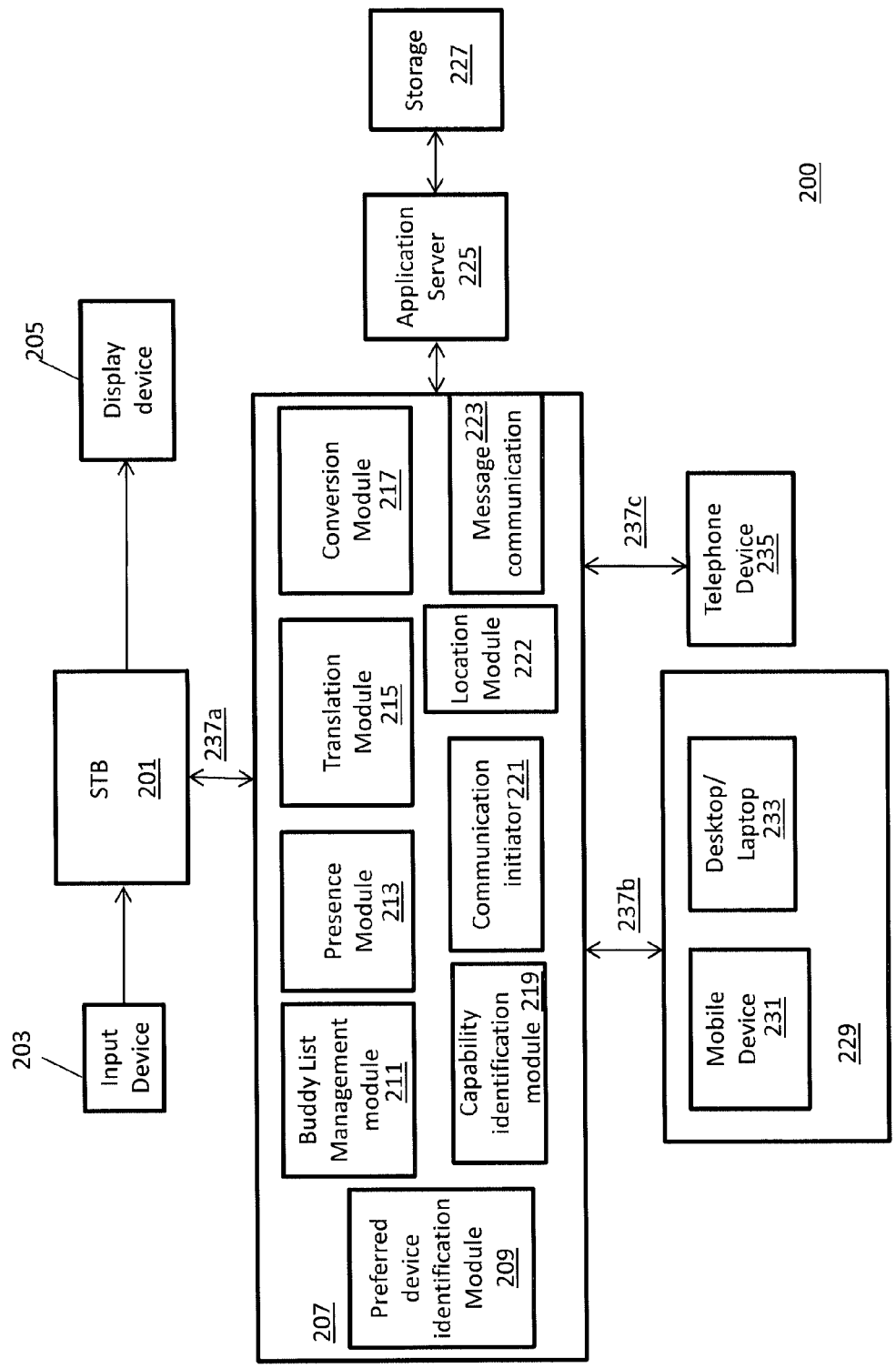
FIG. 2 illustrates a diagrammatic representation depicting a convergence gateway for social networking, in accordance with one embodiment of the present technique.

FIG. 2 illustrates a diagrammatic representation depicting a convergence gateway for social networking, in accordance with one embodiment of the present technique. An STB device 201, a computing device 229 and a telephone device 235 are enabled to interact bi-directionally with a convergence gateway 207. Further, the STB device 201 is enabled to take input instructions from an input device 203 and display user interaction information on a display device 205. The input device 203 may be selected from a group of a keyboard, a virtual keyboard, a remote device, a cell phone's keyboard, a microphone, a wireless device, a special device and the like. The input device 203 is linked to the STB device 201 through one of Radio-Frequency Identification (RFID), Bluetooth, Infrared (IR), Wi-Fi, wired or non-wired channels and the like. The special device is any apparatus that can be enabled to act as an input device for the STB device 201. The display device 205 may be selected from, but is not limited to, a television and a monitor.

In one embodiment, the convergence gateway 207 is communicatively coupled to a STB device 201, one or more computing devices 229, and the telephone device 235. The computing device 229 includes, but is not limited to, a mobile device 231 and a personal desktop/laptop device 233. The mobile device 231 may be any of a mobile phone, a smart phone, a personal digital assistant (PDA), a cell phone, a handheld device and the like. The personal desktop/laptop device 233 may be any of a personal desktop, a laptop, a netbook, a notebook and the like. The convergence gateway 207 facilitates seamless communication between the STB device 201, the mobile device 231 and the personal desktop/laptop device 233. The seamless communication between the computing device 229 and the STB device 201 is enabled by a network (237a-237c). The network (237a-237) may be Internet, Intranet, wireless area network (WAN), local area network (LAN), Ethernet, telephony network and a network service of media content service provider. In one embodiment, a social networking application is implemented as a web application and hosted on an application server 225. The user of a communication device may access the social networking application using a URL of the social networking application. The user—a sender or a recipient—is enabled to interact with the social networking application through the convergence gateway 207. The convergence gateway 207 comprises one or more modules to facilitate interaction, for example a preferred device identification module 209, a buddy list management module 211, a presence module 213, a translation module 215, a conversion module 217, a device capability identification module 219, a communication initiation module 221, a location module 222, and a message communication module 223. It should be noted that one or more modules of convergence gateway 207 can be integrated or may be stand-alone and the integrated modules or the stand-alone modules used as such are within the scope of the present technique.

In one embodiment, the preferred device identification module 209 enables identifying a preferred device from among the multiple associated communication devices of the user. The preferred device is identified based on a set of rules. The set of rules used for identifying the preferred device using the preferred device identification module 209 may include type of message, personal choice of the recipient, presence information, time of the day, environment around the recipient and location of the recipient. In one embodiment, the message is delivered to an appropriate communication device based on the type of the message. For example, the recipient may have multiple associated communication devices, for example the mobile device 231 wherein the mobile device is a low end mobile device, the display device 205, for example a TV associated with the STB device 201 and the like. If the message received is a video message, then the video message is preferably delivered to the TV 205 through the STB device 201 since the TV 205 has a better capability to display the video message than the low end mobile device 231. In another embodiment, based on personal choice, the recipient is enabled to assign one of the communicating devices as a preferred communication device. For example, a recipient may assign mobile device 231 as the preferred communication device from the list of associated communication devices. In the event of receiving a message, the message is delivered to the preferred communication device, i.e., mobile device 231. In yet another embodiment, the preferred communication device is determined based on the presence information of the recipient. Among the multiple associated devices, the recipient will appear online on the mobile device 231 when the recipient accesses the social networking application using the mobile device 231. The presence information may voluntarily be set by the recipient or determined by the presence module 213 of the convergence gateway 207. In yet another embodiment, the preferred communication device is selected based on the time of receiving the message. For example, during a day time, for example at around 2 PM, a recipient would like to receive message on his mobile device whereas in the night, say at around 9 PM, a recipient would like to receive the message on his television device as he would be watching television at that time. The time periods mentioned are exemplary and a user may define time periods and the type of associated communication device for receiving the message. The location of the user can also be used while determining the preferred device, for example while in office wherein 'office' is selected as location, the message may preferably be received on desktop/laptop 233, while away from his desktop/laptop, the message may preferably be received on mobile device 105a such as smart phone or mobile phone. The location can also be name of a place, city and the like. In yet another embodiment, the message me delivered based on environment around the recipient. For example, if the recipient select environment as 'with family members', the message may preferably be delivered at mobile device 231.

The buddy list management module 211 of FIG. 2 facilitates the user in creating a list of friends using a unique identifier, for example, a mobile number, an email user, and unique customer identification number provided by a service provider, such as a unique customer identification number provided by the media service content provider 111 in FIG. 1 and the like. Additionally, the buddy management module 211 is configurable to manage a recipient list. The management of the recipient list comprises assigning screen name, avatar, smiley, icon, creating buddy groups and the like. Further, the user may create a group of recipients, for example, 'FAMILY' for family members, 'CRICKET' for cricket followers, 'CLASSMATE' for school mates and the like. The group of people may be referred to as a buddy group, for example 'FAMILY' may be a buddy group for family members.

The presence module 213 assists in identifying availability of the users in the buddy list and the preferred communication device associated with the users. According to one embodiment of the present technique, the presence module 213 assists in identifying availability of users. For example, a user of social networking application may associate a mobile device 231, a STB device 201, a personal desktop/laptop computer device 233 and a telephone device 235. Further, the user may set status presence information voluntarily, for example, the STB device 201. If the recipient accesses the social networking application using more than one associated device, such as the STB device 201, the mobile device 231, and the desktop/laptop device 233, the recipient will appear online on the STB device 201 only. Alternatively, the presence information of the recipient is determined by the presence module 217. Such as, if the recipient accesses the social networking application through the multiple associated communication devices such as mobile device 231, STB device 201 and desktop/laptop 233, the recipient status is displayed online on all the associated communication devices. Alternatively, the recipient may send a request to the sender to communicate the message on any of the other associated communication devices, for example on the mobile device 231 or on the personal desktop/laptop device 233. Optionally, the receiver may respond to the sender using communication devices other than the communication device on which the recipient has received the message. Additionally, if a user, say a sender or a recipient, accesses a particular communication device, for example the STB device 201, the presence module 213 enables the user to select his status as offline for the members of certain defined buddy groups, for example 'CRICKET' buddy group, while the user may appear online for other buddy group members, for example 'FAMILY' buddy group or 'CLASSMATE' buddy group.

In one embodiment, if the user is using the STB device 201 as a communication device and input device 203 is employed for interacting with STB device 201, the user may enable an autosensing mode to receive or not to receive a message on a display device 205. The autosensing functionality enables the user to receive and/or reject the message from restricted buddy groups or members of the buddy group. For example, from the 'CLASSMATE', the 'FAMILY' and the 'CRICKET' buddy groups, the user may select not to present any message from the 'CLASSMATE' buddy group to the TV 205 through the STB device 201. While enabling the autosensing, the user is required to decide type of the input device 203 linked for autosensing. Disconnection of the linked input device 203 from the STB device 201 may result into not receiving any message from a member of the restricted buddy group or the restricted member of the buddy list whereas connection of the linked input device 203 to the STB device 201 may result into receiving the message from the member of the restricted buddy group. In one embodiment, the restricted member may be an individual of the buddy group or an external community group. It should be noted that autosensing may also be enabled using a webcam wherein the webcam can be integrated with the STB device, a personal/laptop computing device, and a mobile device. If autosensing is enabled using the webcam, the presence of the user and whether the user is available alone or with other people is detected through known biometric techniques, for example, using face detection and such an enablement is within the scope of the present invention. Thus, the environment around the user of the webcam is identified using the webcam. Based on the environment around the user, the message may be delivered or not delivered wherein the user of the webcam, using the social networking application, has defined the buddy group and/or the buddy members from whom the message should not be received if the user of the webcam is not alone. It should be noted that the user of the computing device 229 may also be enabled to define the environment and the message delivery restriction thereof wherein the mobile device 231 with camera and/or the desktop/laptop with webcam are capable of identifying the environment around the user of the associated device users. The autosensing mode can be enabled through presence module 213 or through a standalone module (not shown in the FIG. 2) and such an enablement is within the scope of present technique.

The input device 203 may be selected from a keyboard, a virtual keyboard, a remote device, a cell phone's keyboard, a microphone, a wireless device, a special device and the like. The special device is any device which may link to the STB device 201 through a network system and may be used for input requirements. The input device 203 is linked to the STB device 201 through one of known technologies such as RFID, Bluetooth, IR, Wi-Fi, wired or non-wired channels, and the like. The input device 203 enables the user to perform various functionalities such as browsing entertainment channels, selecting any channel, browsing social networking services, providing voice/audio/video/text message inputs or providing inputs for received message, browsing stored contents such as DVD/recorded contents and other services that are provided by the media content broadcaster or social networking application. In other words, the input device 203 enables the user to control and manipulate various services and capabilities provided by the social networking application or the media content provider. Additionally, the input device 203 facilitates entering text message using predictive text methodology. The predictive text methodology assists in determining what sentence, phrase or word has been intended by the user, and subsequently the predictive text entering helps the user to type the message faster. The predictive text methodology also helps in spelling prediction and correction of the words. The predictive text is providing using a large word list and the ability to increase that list based on the frequency of word usage. In one embodiment, the user of the STB device 201 is provided with an option to appear 'offline' or 'away' if the link between the input device 203 and the STB device 201 is disconnected. For example, if the input device 203 is a mobile device and the input device 203 is linked to the STB device 201 through Bluetooth, when the user of input device 203 moves away by a defined range, input device 203 and the STB device 201 get disconnected and the user status may be displayed as 'away' or 'offline'. Subsequently, the convergence gateway 207 stops delivery of any message to the STB device 201. Additionally, the user of the social networking application has the option of deciding which input device 203 should enable autosensing functionality. For example, from the list of multiple linked input devices 203 i.e., a mobile device, a remote, a special device, the user may select the autosensing capability to be enabled for the mobile device and the special device and not for the remote. Thus, if the mobile device or the special device gets disconnected, the message communication module 223 of the convergence gateway stops delivery of a message initiated by a restricted recipient or member of a buddy group. Therefore, no message is delivered to the STB device 201 from the restricted recipient or a member of any restricted buddy group (for example 'CRICKET'). Based on autosensing capabilities, the user may not receive any message in his absence on the said device, though another user can watch the TV 205 using the STB device 201 and remote as the input device 203.

In one embodiment, a sender, using the associated communication device, may send a message to a communication device although the recipient appears offline on one or more of the associated communication devices. The user, for example a sender, may select a recipient from the buddy list though the status of the recipient does not appear 'available' and sends a message that is intended to be delivered to the associated communication device of the recipient. The message is stored at storage device 227. When the recipient accesses the social networking application through any of the associated communication devices, for example through any of the STB device 201 and the computing device 229, the presence module 213 identifies the communication device based on the set of rules as discussed in FIG. 1 and/or FIG. 5. Subsequently, the message is delivered to the available associated communication device using the message communication module 223.

In one embodiment, a communication device capability identification module 219 enables the convergence gateway 207 to identify the capabilities of the associated communication device. The communication device capability can be identified based on one or more parameters such as type of communication device, type of message, bandwidth capability, screen resolution and the like. The identification of the capabilities of the associated communication device facilitates the delivery of message in an appropriate format. For example, if the associated communication device is a low end mobile device 231, there is a possibility that an intended received video message may not be executed on it. However, a video message may be easily played on TV 205 wherein the video message is provided through the linked STB device 201. Therefore, the video message is delivered on more capable device i.e., TV 205. Similarly, if the intended received message is an audio message, and the mobile device is a low end device and not capable to execute audio message, then the audio message may be converted into a text message using the conversion module 217 and presented to the mobile device 231.

In one embodiment, a translation module 215 is provided to enable multilingual message communication. For example, for a text based message, if the preferred language of the recipient communication device is different from the language of the sender, the translation module 215 determines the language of the sender message and the preferred language of the recipient communication device. Subsequently, the received text message is translated into the preferred language of the recipient communication device and the translated message is displayed at the recipient communication device.

In another embodiment, the conversion module 217 of convergence gateway 207 may transform the message format based on communication device capability or user's selection. For example the conversion module 217 may transform an audio message into a text message and vice versa. After conversion of the message into the targeted format, the message is delivered to the recipient using message communication module 223. For example, if the intended received message is an audio message, the recipient may choose to receive the message in text format wherein the conversion module 217 is instructed, using the associated communicated device, to transform the message from the audio message to the text message and delivered to the associated communication device of the recipient. Similarly, if the intended received message is a text message, the recipient may receive the intended message as an audio message. Alternatively, the sender may record a voice message and instruct the conversion module 217 to convert the voice message into a text message wherein audio message include voice message. Subsequently, the text message is delivered to the intended recipient wherein the instruction for transforming the message is initiated by the associated and converted by the conversion module 217.

In one embodiment, the message communication initiation module 221 of the convergence gateway 207 assists in initiating the process of sending the message using a message communication device, for example the STB device 201, the mobile device 231, the personal desktop/laptop communicating device 233 and the telephone device 235. For the message communication through the STB device 201, the user, such as a sender accesses the social networking application using the input device 203 and may send a message to a recipient in the buddy list. The sender interactions and the message are displayed on the display device 205. Similarly, a user, such as a sender associated with a mobile device 231 or the personal desktop/laptop communication device 233 may login to the social networking application and initiate the process of sending a message to any recipients in the buddy list. It should be noted that sender's initiated message may be selected from a group of SMS, MMS, audio, video and the like. It should be noted that audio message includes voice message of the sender. The message may be transformed into another format such as from the audio/voice to text message and vice versa wherein the format may be transformed using the conversion module 217 and instructed using associated communication device. For example, the sender may initiate sending of a message using associated mobile device 231, or microphone linked to STB device 201 or desktop/laptop 233 wherein the message is a voice message. The sender is provided the option of sending the voice message without any transformation or transformation into text format using the conversion module 217. When a sender selects the option of sending the message in a transformed format, the voice message is transmitted to convergence gateway 207 which transforms the message into an appropriate format such as text using the conversion module 217. Thus, the message may be delivered as text message to a recipient.

In one embodiment, the location module 222 enables the sender or the recipient to provide a geographical location of the associated communication device of the recipient or the sender. For example, if the message sender is a TV viewer and the message recipient is associated with a mobile device 231, the social networking application enables the sender to provide the location of the recipient. The location of the recipient may be identified through voluntary disclosure by the user of the associated device or using known techniques, such as GPS. In voluntary disclosure of location by the user of the associated device, such as the recipient associated with a mobile device 231, the recipient may access the social networking application using the mobile device 231 and input in the application his location such as at City CLUB, at OFFICE, HOME, and the like. Alternatively, the location module 222 may automatically identify the location of the recipient using known technique such as GPS, GSM based positioning and the like. Techniques such as GPS, GSM based positioning, and the like are well known in the art and are not described herein for the sake of brevity.

In one embodiment, the message communication module 223 enables the user, using a STB device 201, a computing device 229, and a telephone device 235, to deliver and receive the message. The message, being delivered or received, is transferred using any of instant messaging (IM), short message service (SMS), multimedia messaging service (MMS), e-mail, video session. The storage device 227 stores the information relevant to buddy list, groups of buddy list, messages and the like. The storage device 227 may be a database, a memory device, a flash memory and the like.

In one embodiment, the STB device 201 may be configured to synchronize the entertainment channel in response to receiving a message from the sender and record predefined content. The predefined content may be any multimedia content such as audio or video that is broadcasted on a channel by a media content provider 111 of FIG. 1. A user, such as a sender, may send an invite message to a recipient to watch the channel wherein the message is transmitted using the associated communication device. It should be noted that the message is delivered based on the presence information of the recipient. If the recipient receives the message on STB device 201, he may accept the invite and subsequently watch the same channel as invited by the sender. If the recipient is available on a communication device other than STB device 201, such as on mobile device 231 or desktop/laptop 233, the recipient may accept the invite message and instruct the STB device 201 to record the content broadcasted on the channel. The recorded content is stored on memory or storage hardware of the STB device 201 and may be played (executed) later at any time as selected by the recipient.

In one embodiment, a user of STB device 201 may initiate a message communication by accessing the URL of the social networking application hosted on the application server 225. The message communication is facilitated by the convergence gateway 207. On accessing the social networking application through the STB device 201, the presence module 213 of the convergence gateway 207 determines that message communication is initiated from the STB device 201. Subsequently, the convergence gateway 207 sends an XML request to the application server 225 which responds with an XML response comprising application specific information. Subsequently, these XML pages comprising the application specific information are converted into XHTML pages and rendered to the end user on the TV display 205.

In another embodiment, a user of personal desktop or laptop 233 may initiate a message communication by accessing the URL of the social networking application hosted on application server 225. The message communication is facilitated by the convergence gateway 207. On accessing the social networking application through the personal desktop or laptop 233, the presence module 213 of convergence gateway 207 determines that message communication is initiated from the personal desktop or laptop 233. On identifying that the request for accessing the social networking application has been initiated from the personal desktop or laptop 233, the application server 225 renders HTML pages to the personal desktop or laptop 233.

In one embodiment, a user of the mobile device 231 may initiate a message sending by accessing the URL of the social networking application hosted on application server 225. The message communication is facilitated by the convergence gateway 207. On accessing the social networking application through the mobile device 231, the presence module 213 of convergence gateway 207 determines that the process of sending the message is initiated from the mobile device 231. Subsequently, the convergence gateway 207 sends an XML request to the application server 225 which responds with an XML response comprising application specific information. Subsequently, these XML pages comprising the application specific information are converted into XHTML pages and rendered to the end user on mobile device 231.

In one embodiment, the social networking application of application server 225 may be integrated with an external social networking application and enables a user to provide micro-blogging or blog-posting. Such an external social networking website may be selected from the ORKUT, TWITTER, FACEBOOK and the like. It should be noted that the external social networking website is not controlled by the social networking application hosted on the application server 225. The micro-blogging service allows the user to provide a rating or an opinion posted on the external social networking website. The opinion may be a text-based message or an update in response to micro-blogging. It should be noted that while the user have accessed the social networking application hosted on application server 225, the user may continue viewing a program on the TV 205 through the STB device 201. Thus, the user may access the external social networking website and post micro-blogging and receive updates from the micro-blogging. Also, the user of social networking application hosted on application server 225 may provide micro-blogging for members of his/her buddy list that may not be displayed to the members of external social networking websites.

It should be noted that a user of the social networking application, whether a sender or a recipient, may not require to login to the social networking application every time the user intends to access the social networking application. The user may save and store his credentials. Also, the user is enabled to modify and delete his social networking profile. Additionally, a service provider, for example a media content broadcaster or an IPTV service provider, may enable a default social networking access on a device, for example on the STB device 201. Therefore, the user of the STB device 201 may not need to provide his credentials to access the social networking application. Additionally, one or more modules of convergence gateway 207 may be implemented in a communication device and such an enablement is within the scope of the present technique.

Figure 3:
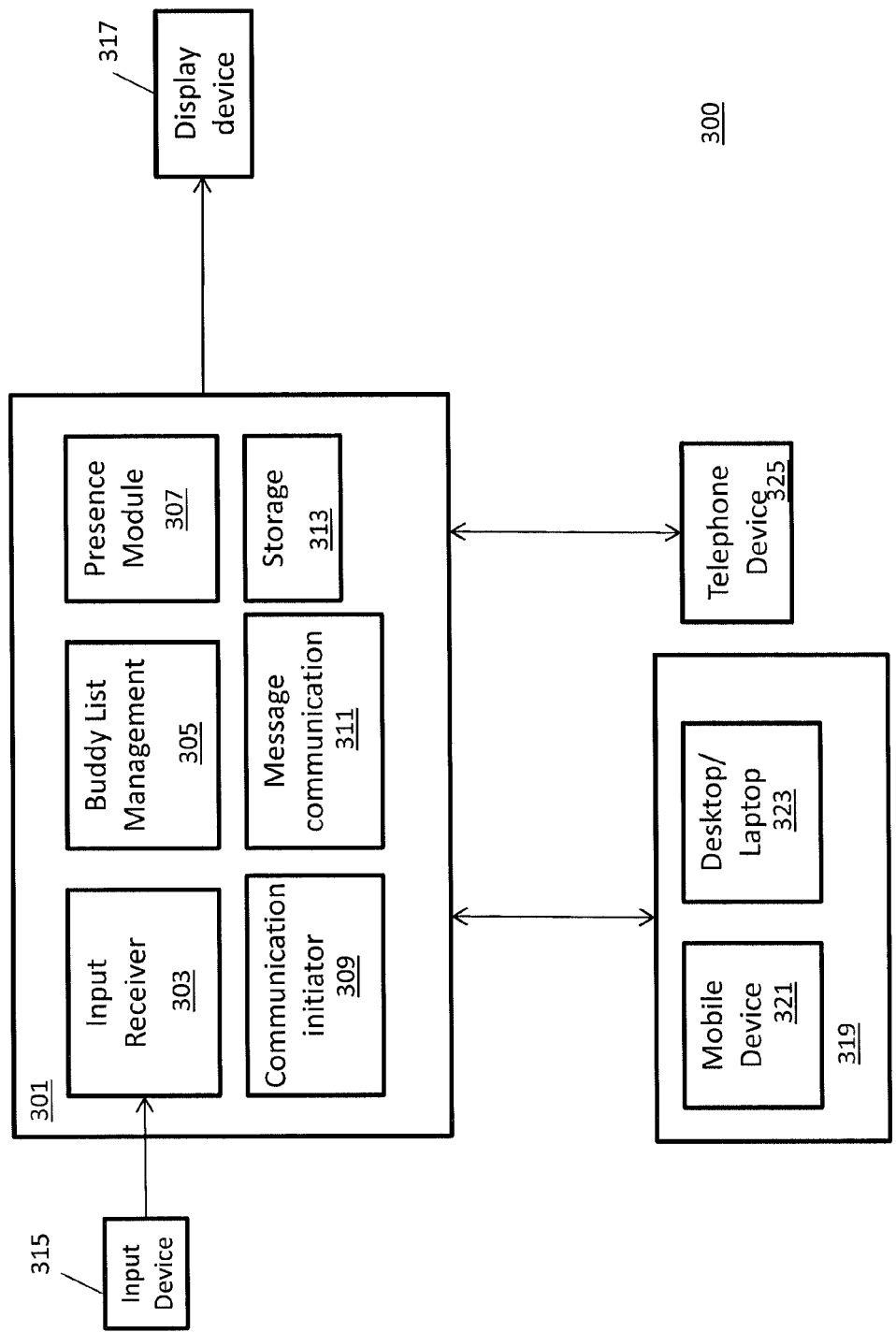
FIG. 3 illustrates a system diagram enabling social networking using a set-top box, in accordance with one embodiment of the present technique.

Referring to the next drawing, FIG. 3 illustrates a system diagram enabling social networking using a set-top box, in accordance with one embodiment of the present technique. The social networking system 300 includes a STB device 301, a display device 317, a computing device 319, and a telephone device 325. It should be noted that the STB device 301, the display device 317, the computing device 319 and the telephone device 325 are linked through a network 115 as described in FIG. 1. The STB device 301 comprises an input receiving module 303, a buddy list management module 305, a presence module 307, a communication initiation module 309, a message communication module 311 and a storage module 313. The input receiving module 303 receives instruction from an input device 315. The input receiving module 303 initializes other modules of the STB device 301, for example presence module 307, the buddy list management module 305 and the like. Further, the input device 315 enables usage of various functions of the STB device 301, such as creating a buddy list using buddy list management module 305, browsing entertainment channels, selecting any channel, browsing social networking services, providing voice/audio/video/text message inputs or providing inputs for received message, browsing stored contents such as DVD/recorded contents and other services that are provided by the media content broadcaster or social networking application. In one embodiment, the input device 315 may be selected from a keyboard, a virtual keyboard, a remote device, a cell phone's keyboard, a microphone, a wireless device, a special device and the like. Additionally, the instruction initiated though the input device 315 provides control capabilities for the STB device 301, that is, the capabilities to change entertainment channel, record a program, execute an application and the like. For example, the input device 315 assists in implementing the social network application on the STB device 301. Additionally, the social networking application may be implemented on an application server 225 of FIG. 2 and accessed through a URL. In one embodiment, the social networking application may be implemented on one or more communication devices. For example, the social networking application may be implemented on the STB device 301. The buddy list management module 305 enables the user to create and manage a list of recipients. An invitation to join the social network is sent by a sender using the associated communication device to a recipient associated with a communication device wherein each communication device is assigned with a unique identifier. As apparent to those skilled in the art, the unique identifier can be, but not limited to, a mobile number, a user login ID, customer identification number and the like. The buddy list comprises name of the recipient, the unique identifier, the associated communication device of the recipient and other information relevant to the user. Additionally, the buddy list management module 305 is configurable to manage the recipient list. The management of the recipient list comprises assigning screen name, avatar, smiley, and the like. Further, the user may create groups of the recipients which can be termed as buddy groups, for example 'FAMILY' for family members, 'CRICKET' for cricket followers, 'CLASSMATE' for school mates and the like. Additionally, the management of the list of the recipients includes, but is not limited to, buddy group creation, defining one or more restricted members of buddy list or the buddy group for a communication device.

In one embodiment, the presence module 307 is configurable to provide availability information of the recipient. The availability information comprises information on whether the recipient is present online that is whether he/she is available to receive messages any on the associated devices. For example, on accessing the social networking application through an associated communication device, for example the STB device 301, the user may view the online status of the recipients. The recipients are presented as 'online' based on presence status set by himself or determined by the presence module 307. Additionally, if a user accesses a particular communication device, for example the STB device 301, the presence module 307 enables the user to select an option of not displaying him/her as online for certain defined buddy groups, for example, for 'CRICKET' buddy group, while the user may appear online for other buddy group members for example 'FAMILY' buddy group or 'CLASSMATE' buddy groups.

Additionally, the communication initiation module 309 assists a user in initiating a message session. The message content may be a text message, a multimedia message, content provided by a media service provider, audio/video/DVD content, pre-recorded content, images and the like. The initiation of message session enables a user to send a message communication through an instant messaging session, an SMS session, an MMS session and the like. The received message communication or the sent message communication may be stored using a storage module 313. It should be noted that the message content may be stored locally at the storage module 313 or at storage device 227 of FIG. 2. Further, the sent message or the received message, stored in the storage module 313, may be accessed and deleted at a later period, as desired by the user.

The display device 317 enables a user to view the message communicated by message communication module 311. The message communication module 311 enables the sender to provide message content to a recipient. The display device 317 may be any of a TV, a monitor and the like that can display the output of the STB device 301. Similarly, the social networking application can be accessed by the computing devices 319 and may initiate message communication thereof. It should be noted that the social networking application may be implemented on the application server 225 of FIG. 2 or hardware module/software may be implemented on computing device 319. The computing device 319 may be, but is not limited to, a mobile device 321 and a personal desktop/laptop device 323. Further, it should be noted that the mobile device 321 can be, for example, a PDA, a smart phone, a mobile phone, a cell phone and the like. The personal desktop/laptop device 323 can be, for example, a personal desktop computer, a netbook, a notebook, a laptop and the like. On implementing the social networking application on any of the computing devices 319, the user of the computing device, for example a sender or receiver, may create a buddy list, manage the buddy list, send and/or receive message, display presence based information, and the like. In one embodiment, a user is enabled to interact with social networking application using the associated telephone device 325. The telephone device 325 would be capable of replying to a received message communication. The received message communication is displayed at an interface (not shown in the figure). For example if the received message is a text message, it is displayed at the interface wherein the telephone device 325 is provided with an interface to display message and keypad to reply to a received message. Additionally, the associated interface of the telephone device 325 displays the list of recipients. The user of the telephone device 325 may toggle through the list of recipients, select one of the recipients and initiate a new message communication.

Figure 4:
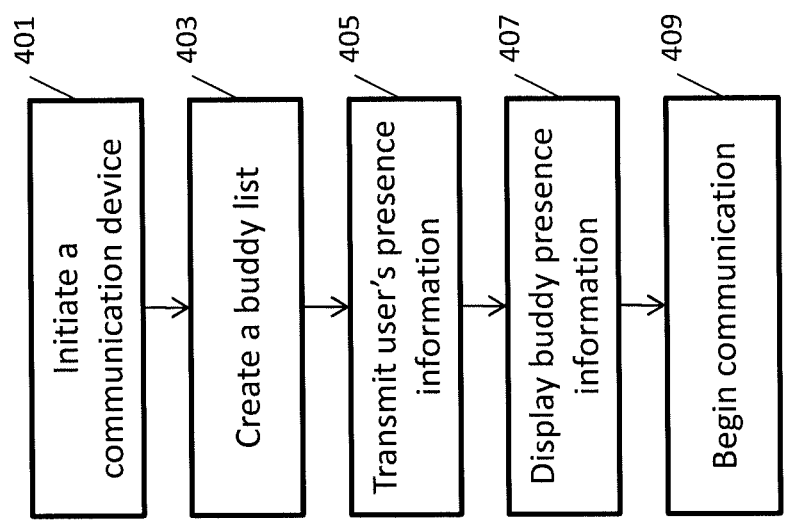
FIG. 4 illustrates a process flowchart providing presence based communication between a plurality of users, in accordance with one embodiment of the present technique.

FIG. 4 is a process flowchart illustrating a method to provide presence-based communication between users, in accordance with one embodiment of the present technique. The process starts when a user accesses the social networking application using the communication device as represented by step 401. On accessing the social networking application, a user may initiate a message with one or more recipients or send a message in response to the received message communication. In one embodiment, the user may initiate a new message communication using a set-top box and send a message to recipient's communication device, for example, to a mobile device, a personal desktop/laptop or a telephone device.

At step 403, a user of the associated communication device may access a buddy list, which is facilitated by buddy list management module 211 of FIG. 2. The buddy list management module 211 assists in creation and management of the buddy list. While creating the buddy list, the user may add various details such as name, unique identifier, mobile number, and the like in his buddy list. Additionally, the user may assign a screen name, an avatar, a smiley, an icon etc to any person listed in the buddy list. Further, the user may creates various groups of the member in the list, for example the user may create a 'CLASSMATE' group for his school mates, a 'CRICKET' group for cricket follower, a 'FAMILY' group for family members and the like. The group of people may be referred to as a buddy group. For initiating a message communication, the user may select a member from the group of the buddy list and send a message communication. Additionally, the user may send a message communication to a group of members, for example, the user may send a lunch invite message to all cricket followers through one message. For example, the user may send a communication "Let us meet at 12.00 PM at LaTerrace" to the 'CRICKET' group in the buddy list. All the members of 'CRICKET' group will receive the lunch invitation at the associated communication device of the users. It should be noted that a message communication can be a text message, a multimedia message, an audio message and the like.

When a user, such as a sender accesses the social networking application, a recipient in the buddy list will appear 'online' if the recipient has also accessed the social networking application using the associated communication device. Once a recipient logs into the social networking application, the presence information is transmitted to the sender as represented by step 405. The presence information is transmitted through the presence module, for example, through the presence module 213 of convergence gateway 207 in FIG. 2. The presence information includes type of device on which the recipient is available, the buddy group he belongs to, and the like. On transmission of recipient presence, the recipient is displayed as 'online' to the sender as shown by step 407. Subsequently, a communication session is established between the sender and the recipient using the associated communication device and message is exchanged thereof. The exchange of message may direct to beginning of message communication between the sender and the recipient as represented by step 409.

Additionally, if a user, say a sender or a recipient, accesses a particular communication device, for example the STB device 201 in FIG. 2, the user may select not to display himself as online for members of certain defined buddy groups, for example, 'CLASSMATE' buddy group, while the user may appear online for other buddy group members, for example, 'FAMILY' buddy group or 'CRICKET' buddy groups. The application may be configured by the user to flag a user as 'online' depending on the type of the device, time of the day, personal choice, presence information, location of the user, environment of the user, user's other appointments and the like.

Figure 5:
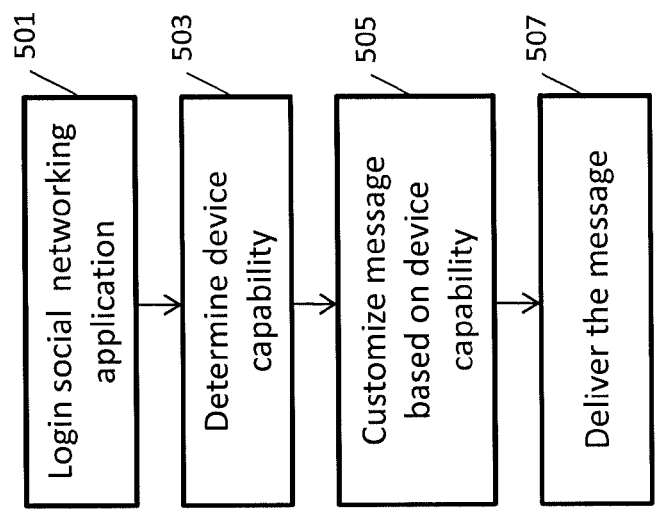
FIG. 5 illustrates a process flowchart depicting communication device capability based message communication, in accordance with one embodiment of the present technique.

FIG. 5 is a process flowchart depicting communication device capability based message communication, in accordance with one embodiment of the present technique. The process starts with logging into the social networking application using the associated communication device as represented by step 501 wherein a communication device may be associated with a user, for example a recipient or a sender. The communication device may include, but is not limited to, a STB device, a mobile device, a personal desktop/laptop computer device and a telephone device. The communication devices are linked to each other through a network, for example Internet, Intranet, LAN, WAN, wireless, packet data transmission enabler and the like. The user may associate one or more communication device with the social networking application. When a communication device is associated with social networking application, the message recipient device capability is captured by the social networking application wherein the social networking application is hosted on an application server and is accessible through the associated communication device.

Before delivering a message to the associated device, the capability of the device such as the ability to handle the type of message, type of communication device, bandwidth capability, screen resolution etc., is identified as represented by step 503. For example, if the associated communication device of a recipient is a low end mobile device, then the communication device may not be able to display a multimedia message, for example a video message. The social networking application enables customization of the message based on the communication device capability and delivering the message in on other mode thereafter i.e., a text message or a audio message and the like as represented by step 505 and step 507. Thus, the message is customized based on the associated communication device and delivered to the associated communication device of the recipient. For example, based on customization requirements, the message is converted into an appropriate format i.e., for a low-end mobile phone, the audio message is converted to a text message or just an alert that rich content has been directed at the user and he/she may access it via a device capable of rendering it. Those skilled in the art will appreciate that a television has better screen resolution and capability to display video content than a mobile device. Therefore, if the received message is a video message, then the video message is preferably delivered to the TV through the STB. However, if the recipient desires to receive the video message on a mobile device, then he may specifically select an option to receive the video message on the mobile device wherein the social networking application provides the user an option to select the associated communication device.

Figure 6:
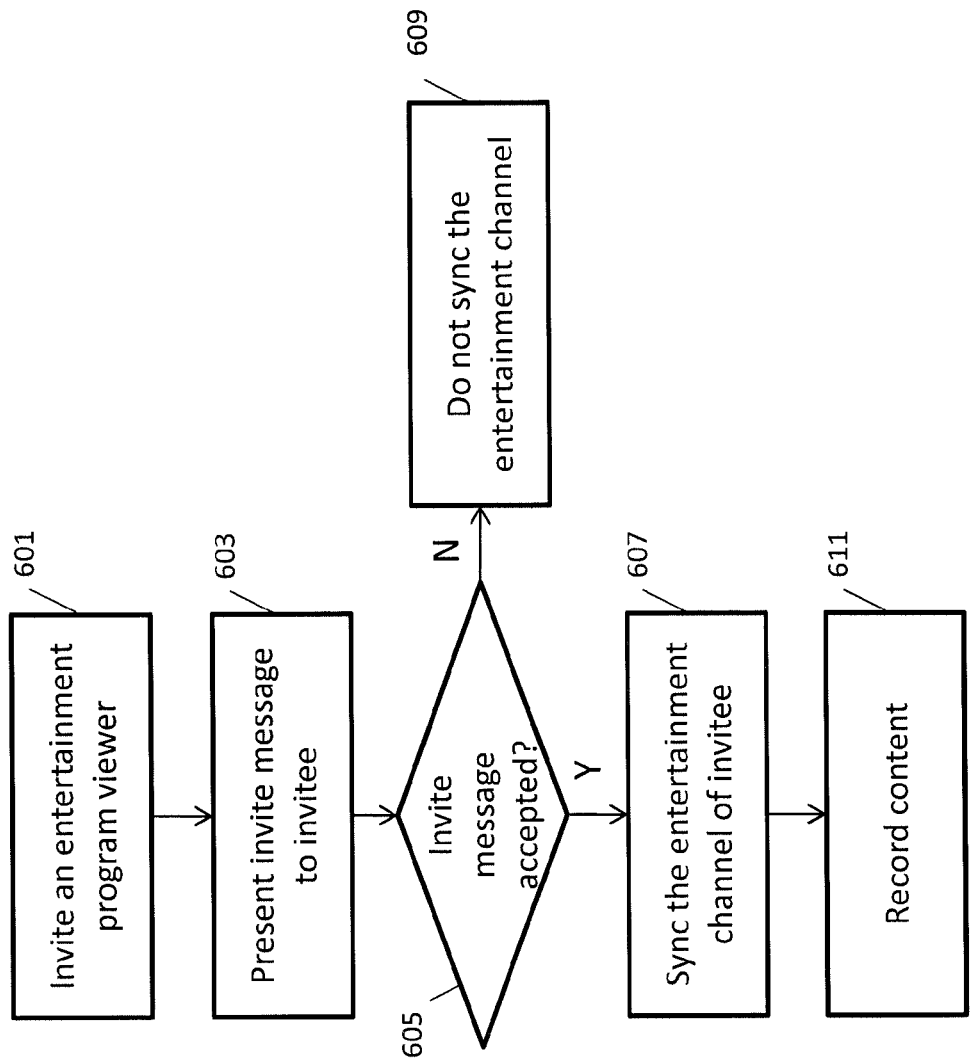
FIG. 6 illustrates a process flowchart depicting synchronization of entertainment channel of a recipient's STB device with a sender's STB device, in accordance with one embodiment of the present technique.

FIG. 6 is a process flowchart depicting synchronization of entertainment channel of a recipient's STB device with a sender's STB device, in accordance with one embodiment of the present technique. The presence module 213 of FIG. 2 enables the viewer of a TV associated with an STB device to identify presence information of people in the buddy list and the type of associated communication devices on which they are online. Additionally, the social networking application implemented enables the viewer to know the entertainment program that is being watched by the recipients in buddy list wherein the recipients are displayed 'online' on the associated STB device. It should be noted that a person appears 'online' when he accesses the social networking application. If a recipient in the buddy list is displayed 'online' on a STB device connected to a TV, the viewer may send an invitation request to the recipient as displayed by step 601 wherein the invitation request is provided for watching an entertainment program on the TV. The invitation request is displayed on the TV linked to the STB device of the recipient. The invitation request includes a message about an entertainment program and an option to switch to the same entertainment program as represented by step 603. For example, a sender may send a message that "Are you interested in watching Lord of the Rings" when the movie 'Lord of the Rings' is being broadcasted on one of the entertainment channels at the given period of time. Additionally, the message may contain tabs "Yes", "No" or "Record" to accept, reject the invite request or record the entertainment program as shown by step 605. If the recipient accepts "Yes" or "Record", the entertainment channel of the recipient's STB device is synchronized with the sender's entertainment channel as represented by step 607 and subsequently the same entertainment program may be viewed on the TV or recorded and stored at the STB device as represented by step 611. If the recipient selects "No", then the recipient's entertainment channel is not synchronized with the sender's entertainment channel as represented by step 609. Optionally, a message may be transmitted to the sender whether the recipient has accepted i.e., selected from "Yes" and "Record or has rejected the invite request.

In yet another embodiment, the user may be presented with an option of recording the entertainment program in response to receiving an invite message. The invite message may be received on any of the associated devices based on presence information provided by presence module 213 of FIG. 2. For example the recipient may be 'online' on mobile device 231 of FIG. 2 and he receives the invite message to view an entertainment program from a sender. The recipient may decline the invite message or record the entertainment program which may be viewed later. On selecting the option of recording the entertainment program, the entertainment program channel of the sender and the recipient are synchronized and the program is recorded at local storage of STB device 201 of FIG. 2.

Figure 7:
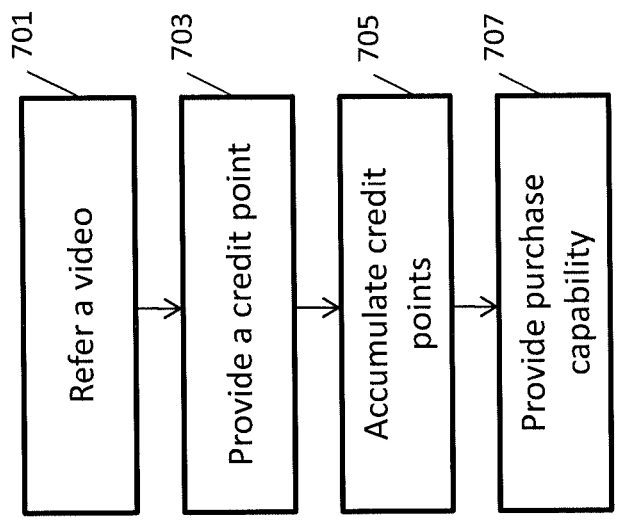
FIG. 7 illustrates a process flowchart depicting a rewarding mechanism for a social networking application user, in accordance with one embodiment of the present technique.

Referring to the next figure, FIG. 7 is a process flowchart illustrating a rewarding mechanism for a social networking application user, in accordance with one embodiment of the present technique. In step 701, a sender may refer a multimedia message, for example, a video to one or more recipients wherein the sender and the recipient(s) are enabled to access the social networking applications. While referring a video to the other recipients, the sender may request the recipients to provide their opinion on it. The opinion may be provided in the form of a ranking, for example ranking between 1 (low end) and 5 (high end), comments, feedback, opinion and the like. Also, the sender may provide his opinion for a video. When the sender or the recipient(s) provides his opinion for a video, one or more predetermined credit points are credited into the account of the referrer (i.e., the sender) and opinion provider (i.e., the recipient) as represented by step 703. The multimedia message, i.e. the video, may be referred to one or more recipients through a hypertext link of the multimedia message or other techniques known in the art. The opinion may include, but is not limited to, text based comments, rating the content and the like. The account of the sender or the recipient comprises profile information, credit point information including total accumulated credit points and the like. The accumulation of credit points includes summation of the credit points as represented by step 705. At step 707, the accumulated credit points may be used for purchasing one or more items. The item for exchange can be a video, a game, a voucher and the like. In other words, the accumulated points can enable the sender or the recipient to exchange it with a video, a game, a voucher or any other item available on social networking application as represented by step 709.

Figure 8:
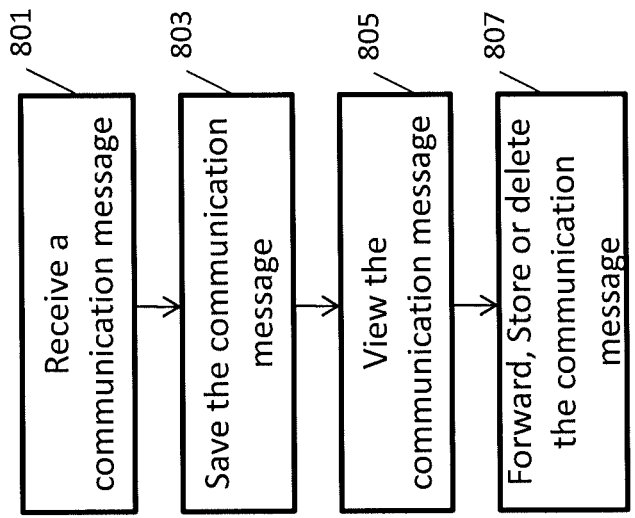
FIG. 8 illustrates a process flowchart depicting management of received and sent messages, in accordance with one embodiment of the present technique.

FIG. 8 is a process flowchart illustrating management of received and sent messages, in accordance with one embodiment of the present technique. At step 801, a recipient receives a message on an associated communication device. For example, the recipient may receive a message communication on the STB device 201 wherein the STB device is linked to a television device 205 to display the message communication. In one option, the recipient may be watching an entertainment program when he receives the video. While watching the entertainment program, the recipient may not be interested in viewing the received video. The recipient of the social networking application may 'save' or 'reject' the received message communication, for example the received video, as represented in the step 803. On selecting the 'save' option, the video is stored at a local data store, for example, at a data storage capability device of the STB device. Alternatively, the social networking application enables the recipient to store the video at a data store linked to the social networking application. Also, the recipient may select the 'reject' option to ignore the message. On selecting the 'reject' option, the message is deleted.

The stored video may be selected for playing it using the input device 203 of the STB device 201 and played the video at any time, for example during an advertisement break of the entertainment program as depicted in the step 805. Optionally, the recipient may play the video after completion of the entertainment program. The saved video, as represented in the step 803, may be stored for any period of time, deleted at any moment of time or forwarded further to other recipients as shown in the step 807.

Figure 9:
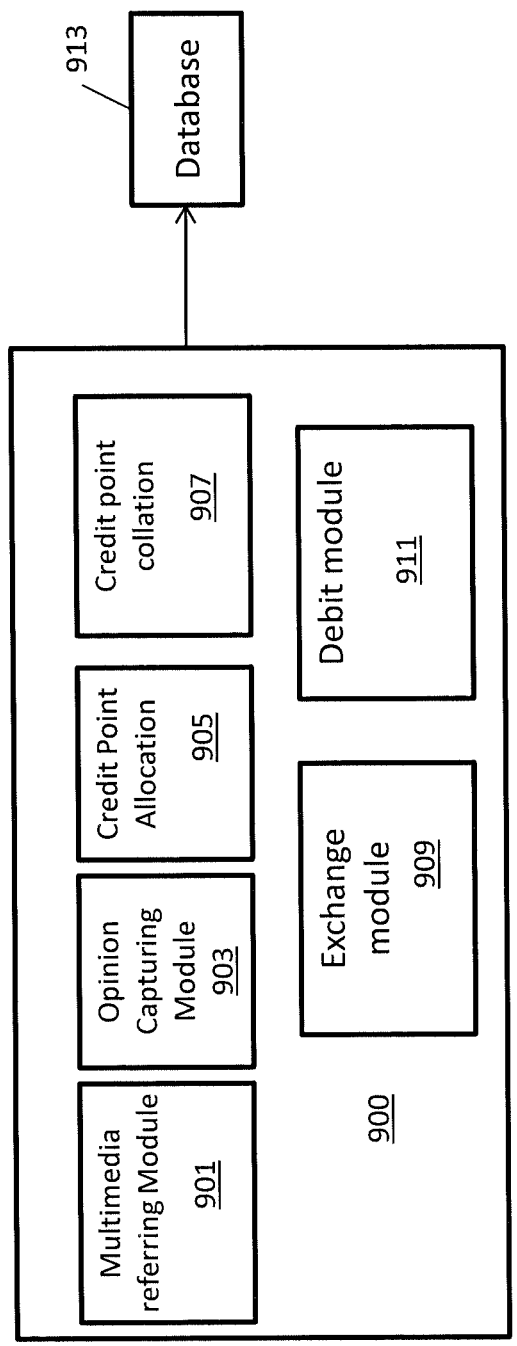
FIG. 9 illustrates a system diagram depicting a mechanism to reward a social network user on referring a multimedia message, in accordance with one embodiment of the present technique.

FIG. 9 illustrates a system diagram depicting a mechanism to reward a social network user on referring a multimedia message, in accordance with one embodiment of the present technique. In a social networking environment 900, a multimedia reference module enables a user, for example, a sender, to refer a multimedia message to a recipient. The multimedia message may be about a product and can be, but not limited to, a video, an audio, an image and the like. The multimedia message may be referred to one or more recipients. The multimedia message may be a video, an advertisement and the like. In one embodiment, the multimedia message is referred as hypertext link of the multimedia message. On referring a multimedia message, stipulated credit points are credited into the account of the sender as represented by multimedia referring module 901. For example, referring a song may earn five credit points for the sender, while referring an image may earn two points for the sender. On referring a multimedia message, the stipulated credit points are credited into the account of the sender. Similarly, stipulated credit points may be credited into the account of the sender when an opinion of the sender is captured by the opinion capturing module 903. The credit point allocation module 905 allocates one or more credit points into the account of the referring sender or an opinion providing sender or recipient. The credit point collation module 907 collates credit points for a sender or a recipient and provides a mathematical sum of the credit points. It should be noted that the multimedia content may available for purchase on exchange of credit points. For example, a movie download may be available in exchange of twenty credit points. If a user, for example, a sender or a recipient, accumulates twenty or more credit points in his account, for example twenty eight credit points, the user may exchange the movie for a twenty credit points and equivalent credit points are debited from the account of the user i.e., eight credit points will remain in the account of the user as represented by block 907, block 909 and block 911. A database 913 is provided to store account information of the users, multimedia message and the like.

Exemplary Computing Environment

Figure 10:
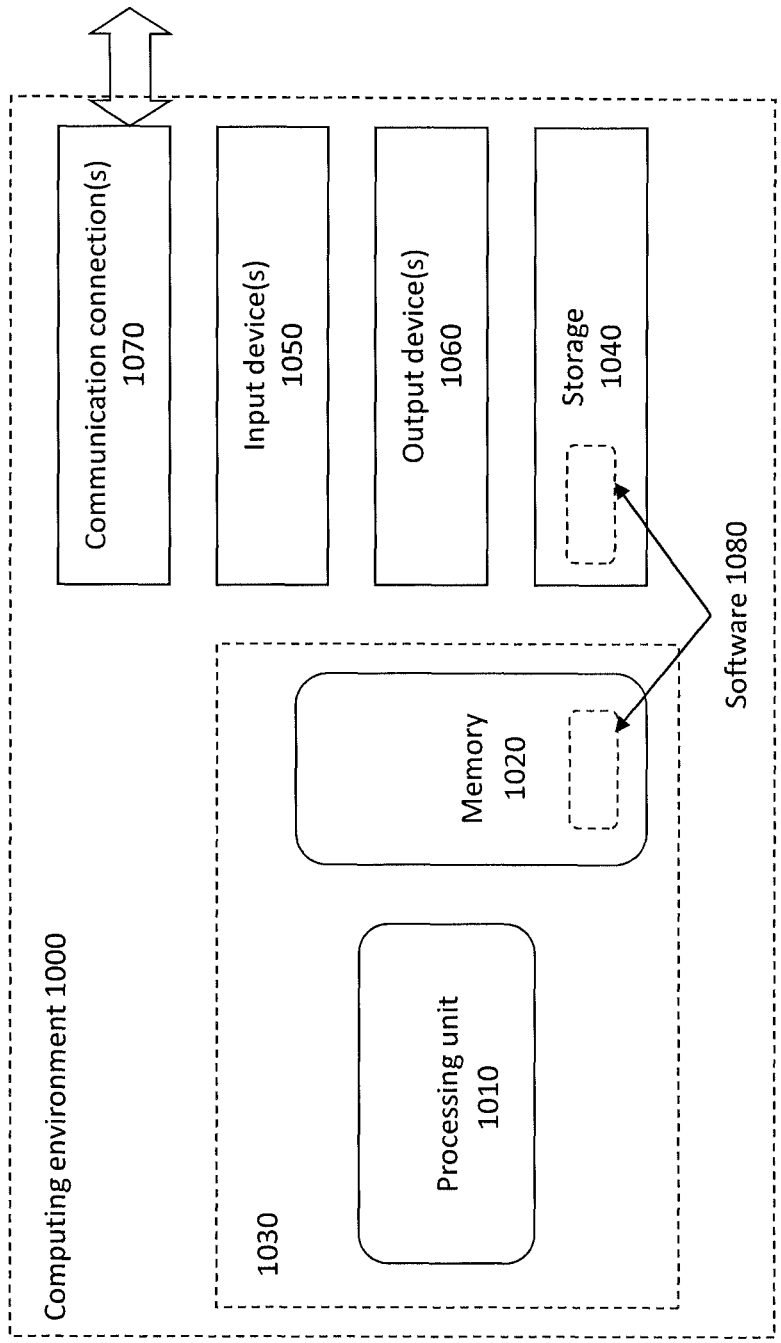
FIG. 10 illustrates a system depicting a generalized computer network arrangement, in one embodiment of the present technique.

One or more of the above-described techniques can be implemented in or involve one or more computer systems. FIG. 10 illustrates a generalized example of a computing environment 1000. The computing environment 1000 is not intended to suggest any limitation as to scope of use or functionality of described embodiments.

With reference to FIG. 10, the computing environment 1000 includes at least one processing unit 1010 and memory 1020. In FIG. 10, this most basic configuration 1030 is included within a dashed line. The processing unit 1010 executes computer-executable instructions and may be a real or a virtual processor. In a multi-processing system, multiple processing units execute computer-executable instructions to increase processing power. The memory 1020 may be volatile memory (e.g., registers, cache, RAM), non-volatile memory (e.g., ROM, EEPROM, flash memory, etc.), or some combination of the two. In some embodiments, the memory 1020 stores software 1080 implementing described techniques.

A computing environment may have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The storage 1040 may be removable or non-removable, and includes magnetic disks, magnetic tapes or cassettes, CD-ROMs, CD-RWs, DVDs, USB drive, or any other medium which can be used to store information and which can be accessed within the computing environment 1000. In some embodiments, the storage 1040 stores instructions for the software 1080.

The input device(s) 1050 may be a touch input device such as a keyboard, mouse, pen, trackball, touch screen, or game controller, a voice input device, a scanning device, a digital camera, or another device that provides input to the computing environment 1000. The output device(s) 1060 may be a display, printer, speaker, or another device that provides output from the computing environment 1000.

The communication connection(s) 1070 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 1000, computer-readable media include memory 1020, storage 440, communication media, and combinations of any of the above.

Having described and illustrated the principles of our invention with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

In view of the many possible embodiments to which the principles of our invention may be applied, we claim as our invention all such embodiments as may come within the scope and spirit of the following claims and equivalents thereto.

The invention claimed is:

1. A method for communication between a plurality of users in a communication network, each of the plurality of users being associated with at least one communication device, the method comprising:
   receiving a message from a sender intended for at least one recipient in the communication network;
   customizing the message for at least one communication device associated with the at least one recipient based on a set of rules, wherein the set of rules comprises identifying a preferred communication device from the at least one communication device of the at least one recipient, ascertaining device capabilities of the at least one communication device, and determining geographical location of the recipient using geographical positioning system (GPS);
   autosensing environment around the recipient using an image capturing device and biometric capabilities associated with the communication device;
   delivering the customized message to the at least one communication device associated with the at least one recipient based on the environment around the recipient; and
   recording on at least one communication device, a predefined content in response to the message of the sender wherein the predefined content is selected from audio and video content.

2. The method according to claim 1 further comprising delivering the message to the preferred communication device when the at least one recipient is available on the preferred communication device.

3. The method according to claim 1, wherein the recipient chooses the preferred communication device based on at least one of type of message, personal choice, presence information, time of the day, environment and location of the recipient.

4. The method according to claim 1, wherein the at least one communication device associated with the sender is selected from a group comprising a computing device, set-top box, and telephone.

5. The method according to claim 1, wherein the at least one communication device associated with the recipient is selected from a group comprising a computing device, set-top box and telephone.

6. The method according to claim 1, wherein the message type is selected from a group comprising a IM, SMS, MMS, audio, video, and email.

7. The method according to claim 1, wherein the message being sent to the at least one recipient is information about audio and video content being broadcasted on a television.

8. The method according to claim 1, wherein customizing further comprises converting the audio message into a text message when the recipient communication device is incompatible to receive audio message.

9. The method according to claim 1, wherein customizing further comprises converting the text message into an audio message.

10. The method according to claim 1, wherein customizing the message further comprises translating a language of the message based on preferred language options of the recipient communication device.

11. The method according to claim 1, further comprises presenting a buddy list at an interface of the at least one communication device associated with the sender, wherein the buddy list comprises at least one of a name, contact number, unique identifier, and presence information.

12. The method according to claim 11, further comprises initiating a communication session between the at least one communication device of a sender and the at least one communication device of the recipient, wherein the communication session is initiated when the sender selects at least one recipient from the buddy list.

13. The method according to claim 12, wherein the communication session is initiated between at least one of the computing device or telephone device of the sender and at least one of the computing device or telephone device of the recipient.

14. The method according to claim 11, wherein the sender is provided with at least one input option to interact with the buddy list, wherein at least one option is selected from a group comprising a virtual keyboard, a cell phone's keyboard, a microphone, a remote control and a special device.

15. The method according to claim 1, further comprising synchronizing television channel of the recipient in response to the message communication of the sender.

16. A system for communication between a plurality of users in a communication network, each of the plurality of users being associated with at least one communication device having a memory for storing computer-executable instructions being executed by a processing unit, the system comprising:
 a receiving module in communication with the processing unit, configured to receive a message from a sender intended for at least one recipient in the communication network;
 a message customization module in communication with the processing unit, configured to customize the message for at least one communication device associated with the at least one recipient based on a set of rules, wherein the set of rules comprises identifying a preferred communication device from the at least one communication device of the at least one recipient, ascertaining device capabilities of the at least one communication device, and determining geographical location of the recipient using geographical positioning system (GPS);
 a delivery module in communication with the processing unit, configured to deliver the customized message to the at least one identified communication device associated with the at least one recipient based on environment around the recipient, wherein the environment around the recipient is autosensed using an image capturing device and biometric capabilities associated with the communication device; and
 a hardware storage device associated with the communication device for storing a predefined content being recorded in response to the message of the sender, wherein the predefined content is selected from audio and video content.

17. The system according to claim 16, further comprising a delivery module in communication with the processing unit, configured to deliver the message to the preferred communication device when the at least one recipient is available on the preferred communication device.

18. The system according in claim 16, wherein the preferred communication device is selected based on at least one of type of message, personal choice, presence information, time of the day, environment and location of the recipient.

19. The system according to claim 16, wherein the at least one communication device associated with the sender is selected from a group comprising a computing device, set-top box, and telephone.

20. The system according to claim 16, wherein the at least one communication device associated with the recipient is selected from a group comprising a computing device, set-top box and telephone.

21. The system according to claim 16, wherein the message is selected from a group comprising a IM, SMS, MMS, audio, video, and email.

22. The system according to claim 21, wherein the message customization module is configured to convert the audio message into the text message when the recipient communication device is incompatible to receive the audio message.

23. The system according to claim 21, wherein the message customization module is configured to convert a text message into an audio message.

24. The system according to claim 16, further comprising: a communication initiation module to initiate the message sending by the sender using the associated communication device to the communication device associated to the recipient.

25. The system according to claim 16, wherein the message being sent to the at least one recipient is information about audio and video content being broadcasted on a television.

26. The system according to claim 16, wherein the message customization module is configured to translate a language of the message based on preferred language options of the recipient communication device.

27. The system according to claim 16, further comprising a presentation module configured to present a buddy list at a interface of the at least one communication device associated with the sender, wherein the buddy list comprises at least one of a name, contact number, unique identifier, and presence information.

28. The system according to claim 27, further comprising a communication initiation module configured to initiate a communication session between the at least one communication device of a sender and the at least one communication device of the recipient, wherein the communication session is initiated when the sender selects at least one recipient from the buddy list.

29. The system according to claim 28, wherein the communication session is initiated between at least one of the computing device or telephone device of the sender and at least one of the computing device or telephone device of the recipient.

30. The system according in claim 28, wherein the sender is provided with at least one option to interact with the buddy list, wherein the at least one option is selected from a group comprising a key board, a virtual keyboard, a cell phone's keyboard, a microphone, a remote control and a special device.

31. The system according to claim 16, further comprises a synchronization module in communication with the processing unit, configured to synchronize television channel of the recipient in response to the message communication of the sender.

32. A computer program product comprising a non-transitory computer usable medium having a computer readable program code embodied therein for communication between a plurality of users in a communication network, each of the plurality of the users being associated with at least one communication device, comprising:
 a program code adapted for receiving a message from a sender intended for at least one recipient in the communication network;
 a program code adapted for customizing the message for at least one communication device associated with the at least one recipient based on a set of rules, wherein the set of rules comprises identifying a preferred communication device from the at least one communication device of the at least one recipient, ascertaining device capabilities of the at least one communication device, and determining geographical location of the recipient using geographical positioning system (GPS);

a program code adapted for autosensing environment around the recipient using an image capturing device and biometric capabilities associated with the communication device;

a program code adapted for delivering the customized message to the at least one communication device associated with the at least one recipient based on the environment around the recipient; and a program code adapted for recording on at least one communication device, a predefined content in response to the message of the sender wherein the predefined content is selected from audio and video content.

33. The computer program product of claim 32, further comprising a program code adapted for delivering the message to the preferred communication device when the at least one recipient is available on the preferred communication device.

34. The computer program product of claim 32, wherein the at least one recipient chooses the preferred communication device based on at least one of type of message, personal choice, presence information, time of the day, environment and location of the recipient.

35. The computer program product of claim 32, wherein the at least one communication device associated with the sender is selected from a group comprising a computing device, set-top box, and telephone.

36. The computer program product of claim 32, wherein the at least one communication device associated with the recipient is selected from a group comprising a computing device, set-top box and telephone.

37. The computer program product of claim 32, wherein the message is selected from a group comprising a IM, SMS, MMS, audio, video, and email.

38. The computer program product of claim 37, wherein the program code adapted for customizing further comprises converting audio message into text message when the recipient communication device is incompatible to receive audio message.

39. The computer program product of claim 37, wherein a program code adapted for customizing further comprises converting the text message into an audio message.

40. The computer program product of claim 37, wherein the program code further comprising: initiating the message sending by the sender using the associated communication device to the communication device associated to the recipient.

41. The computer program product of claim 32, wherein the message being sent to the at least one recipient is information about audio and video content being broadcasted on TV.

42. The computer program product of claim 32, wherein a program code adapted for customizing the message further comprises translating a language of the message based on preferred language options of the recipient communication device.

43. The computer program product of claim 32, further comprising a program code adapted for presenting a buddy list at a interface of the at least one communication device associated with the sender, wherein the buddy list comprises at least one of a name, contact number, unique identifier, and presence information.

44. The computer program product of claim 43, further comprising a program code adapted for initiating a communication session between the at least one communication device of a sender and the at least one communication device of the recipient, wherein the communication session is initiated when the sender selects at least one recipient from the buddy list.

45. The computer program product of claim 44, further comprising a program code adapted for initiating the communication session between at least one of the computing device or telephone device of the sender and at least one of the computing device or telephone device of the recipient.

46. The computer program product of claim 43, further comprising a program code adapted for providing at least one option to the sender to interact with the buddy list, wherein the at least one option is selected from a group comprising a keyboard, a virtual keyboard, a cell phone's keyboard, a microphone, a remote control and a special device.

47. The computer program product of claim 32, further comprising a program code adapted for synchronizing a television channel of the recipient in response to the message received from the sender.

\* \* \* \* \*